(12) United States Patent
Miocevic et al.

(10) Patent No.: US 11,425,002 B1
(45) Date of Patent: Aug. 23, 2022

(54) INFRASTRUCTURE MANAGING FRAMEWORK FOR SERVERLESS ARCHITECTURE

(71) Applicant: Amazon Technologies, Inc., Seattle, WA (US)

(72) Inventors: Danko Miocevic, Vancouver (CA); Tomas Bernardo Kelly, Vancouver (CA); Cristian Javier Lomagno, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 63 days.

(21) Appl. No.: 16/199,856

(22) Filed: Nov. 26, 2018

(51) Int. Cl.
*H04L 41/5054* (2022.01)
*H04L 47/80* (2022.01)
*G06F 9/455* (2018.01)
*G06F 8/30* (2018.01)
*G06F 8/41* (2018.01)
(Continued)

(52) U.S. Cl.
CPC ............ *H04L 41/5054* (2013.01); *G06F 8/30* (2013.01); *G06F 8/427* (2013.01); *G06F 8/60* (2013.01); *G06F 9/44542* (2013.01); *G06F 9/45516* (2013.01); *H04L 47/803* (2013.01)

(58) Field of Classification Search
CPC combination set(s) only.
See application file for complete search history.

(56) References Cited

U.S. PATENT DOCUMENTS 8,286,176 B1 * 10/2012 Baumback ............ G06F 9/5061
709/221
10,108,442 B1 * 10/2018 Camarda Silva Folco ..................
G06F 9/45516
(Continued)

FOREIGN PATENT DOCUMENTS

WO   WO-2019089443 A1 *  5/2019   .......... G06F 11/3664

OTHER PUBLICATIONS

Vijaya et al., "Framework for Platform Agnostic Enterprise Application Development Supporting Multiple Clouds", 2015, 2nd International Symposium on Big Data and Cloud Computing—Elsevier Procedia Computer Science, vol. 50, p. 73-80. Available online at www.sciencedirect.com. (Year: 2015).*
(Continued)

*Primary Examiner* — Dhairya A Patel
*Assistant Examiner* — Sandarva Khanal
(74) *Attorney, Agent, or Firm* — Davis Wright Tremaine LLP

(57) ABSTRACT

Platform-agnostic model source code may refer to a file that includes platform-agnostic notations and source code according to a programming language. The source code may lack explicit references to specific computing resource service providers. The platform-agnostic model source code may be parsed to determine a set of computing resources of a computing resource service provider to provision. The set of computing resources may be provisioned and exposed via an endpoint. The platform-agnostic notations may be used to determine addition source code according to the programming language that can be used to access the set of computing resources. A runtime (e.g., software application) may be generated from the source code and the additional source code such that the execution of the runtime utilizes at least a portion of the set of computing resources.

17 Claims, 8 Drawing Sheets

(51) Int. Cl.
*G06F 8/60* (2018.01)
*G06F 9/445* (2018.01)

(56) References Cited

U.S. PATENT DOCUMENTS

| | | | | |
|---|---|---|---|---|
| 10,182,009 | B1* | 1/2019 | Gupte | H04L 45/72 |
| 10,461,959 | B2* | 10/2019 | Bagepalli | H04L 12/6418 |
| 2011/0161477 | A1* | 6/2011 | Kowalski | H04L 67/02 709/223 |
| 2013/0080480 | A1* | 3/2013 | Mao | H04L 67/10 707/E17.044 |
| 2014/0215444 | A1* | 7/2014 | Voccio | G06F 11/3644 717/128 |
| 2015/0074278 | A1* | 3/2015 | Maes | H04L 67/10 709/226 |
| 2015/0205587 | A1* | 7/2015 | Bates | G06F 9/4552 717/148 |
| 2015/0229613 | A1* | 8/2015 | Baum | G06F 9/4488 713/171 |
| 2015/0301837 | A1* | 10/2015 | Goetz | G06F 8/437 717/148 |
| 2018/0136914 | A1* | 5/2018 | Payette | G06F 8/33 |
| 2018/0267779 | A1* | 9/2018 | Leonelli | G06F 8/447 |
| 2018/0316552 | A1* | 11/2018 | Subramani Nadar | G06F 8/65 |
| 2018/0336254 | A1* | 11/2018 | Bergman | G06F 9/5027 |
| 2019/0272157 | A1* | 9/2019 | Stella | G06F 40/143 |
| 2019/0384580 | A1* | 12/2019 | Martini | H04W 76/12 |
| 2020/0065166 | A1* | 2/2020 | Myneni | H04L 63/0263 |

OTHER PUBLICATIONS

Nick Humrich, "Decorators in Python: What You Need To Know", 2018, Retrieved online at https://web.archive.org/web/20180716153328/https://timber.io/blog/decorators-in-python/. (Year: 2018).*

Vijaya et al., "Framework for Platform Agnostic Enterprise Application Development Supporting Multiple Clouds", 2015, Procedia Computer Science 50 (2015), pp. 73-80, Available online at www.sciencedirect.com (Year: 2015).*

Mishra, Rupesh, "@decorators in Python," May 11, 2017, 8 pages, Hacker Noon, <https://hackernoon.com/decorators-in-python-8fd0dce93c08> [retrieved Sep. 27, 2018].

* cited by examiner

```
import arrow_models
import boto3 def arrow_rest(operation, url):
    def arrow_rest_decorator(func):
        def func_wrapper(param):
            return func(param)
        return func_wrapper
    return arrow_rest_decorator def arrow_dhash(dhash_name, model):
    def arrow_dhash_decorator(func):
        def func_wrapper(name):
            func_globals = func.__globals__
            func_globals[dhash_name]=model(dhash_name)
            return func(name)
        return func_wrapper
    return arrow_dhash_decorator
```
⤴⤵ 502

```
from arrow_decorators import arrow_rest, arrow_dhash, create_db
from arrow_models import Nickname @arrow_rest("GET", "/hello/{name}")

@arrow_dhash("nickname", Nickname)

def hello(name) {
    return "hello " + nickname[name]['nick']
} def hello_handler(event, context):
    create_db()
    message = hello(event['name'])
    return { 'message': message }
```
504

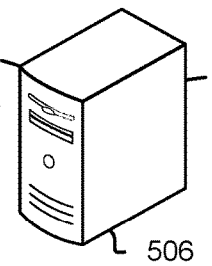

Platform-Agnostic
Application
Deployment
Service

500

INFRASTRUCTURE MANAGING FRAMEWORK FOR SERVERLESS ARCHITECTURE

BACKGROUND

Computing resource service providers may be utilized in a wide variety of contexts to provide computing resources for use by various types of clients that can specify the types and amounts of computing resources that the client desired to be used. In this way, computing resource service providers are useful in many computing systems. However, there are many challenges that make it difficult for a user to utilize computing resource service providers. For example, a software developer may be required to understand, define, and then create the service provider architecture to run services and applications that he/she builds. As a result, there may be delays that are caused by the developer having to understand the services that are provided by a computing resource service provider, but also because the architecture that is created may be completely decoupled from the code and business logic that the software developer writes for his/her application.

BRIEF DESCRIPTION OF THE DRAWINGS

Various techniques will be described with reference to the drawings, in which:

FIG. 5 shows an illustrative example of a computing environment in which function decorators that can be defined and used in connection with platform-specific source code, in accordance with at least one embodiment;

DETAILED DESCRIPTION

Figure 1:
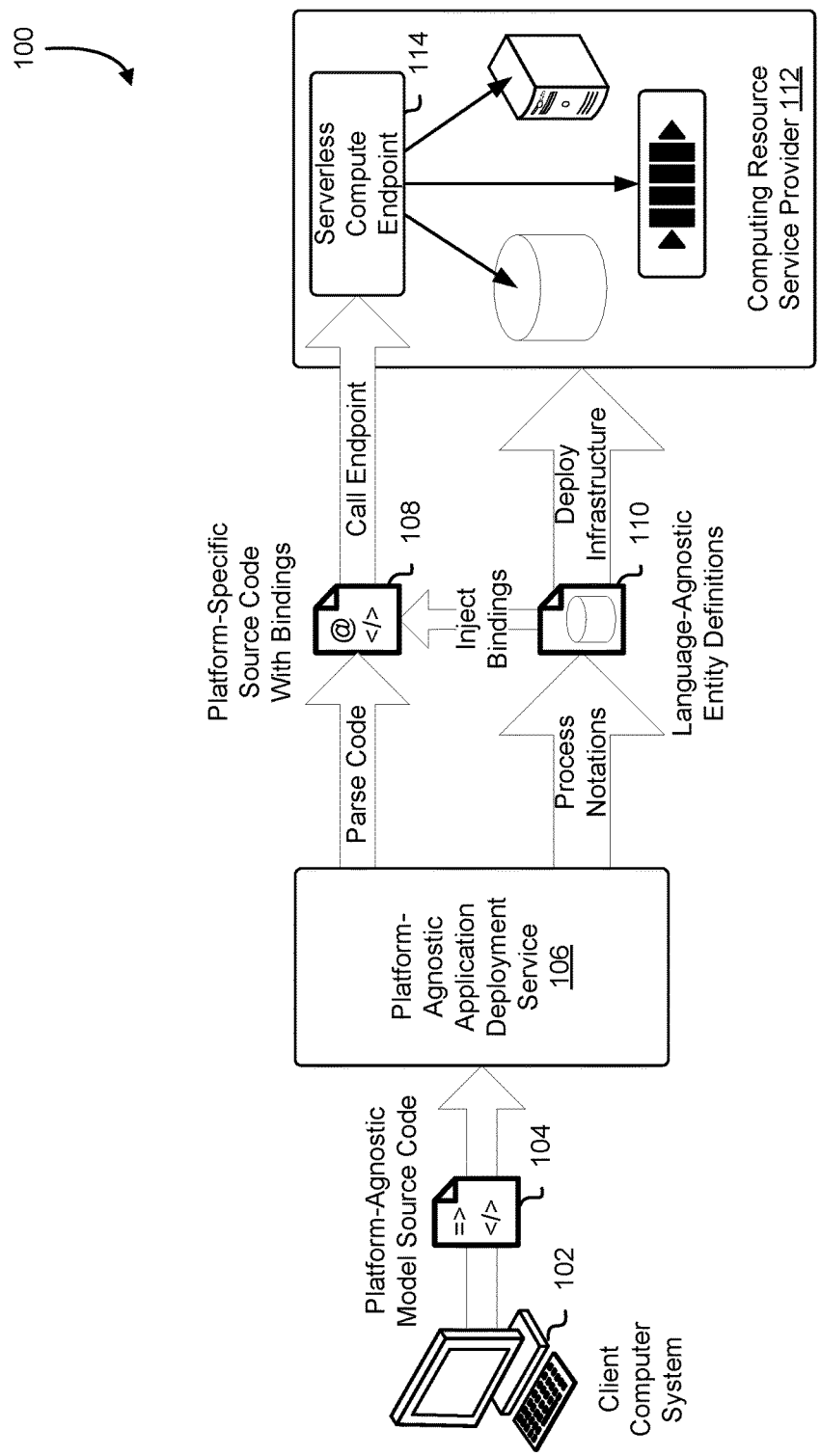
FIG. 1 illustrates a computing environment in which an infrastructure managing framework is implemented, according to at least one embodiment.

A platform-agnostic application deployment service may be an application or service that a computing entity (e.g., on behalf of a client operating a client computer system) that uses platform-agnostic model source code to generate runtimes such as software applications which utilize computing resources of a computing resource service provider. The platform-agnostic model source code may include source code according to a programming language (e.g., Python code) and platform-agnostic notations. The platform-agnostic notations may not be natively supported according to the programming language (e.g., attempting to run the platform-agnostic model source code using a Python interpreter may result in an error). The application or service (e.g., platform-agnostic application deployment service) may parse the platform-agnostic model source code and replace the platform-agnostic notations with additional source code (e.g., additional Python code) that handles the components of the service provider architecture needed to deploy source code. The computing resources of the service provider that are to be utilized are deduced from the platform-agnostic notations and language-agnostic entity definitions and used to generate the additional source code to produce platform-specific source code that can be used to generate a runtime (e.g., platform-specific source code is compiled or interpreted to generate a runtime such as an executable file).

A platform-agnostic application deployment service may be a service of a computing resource service provider that receives, from a client computer system, platform-agnostic model source code that includes a combination of source code and platform-agnostic notations. The platform-agnostic model source code may have a specific extension that indicates whether and/or how platform-agnostic notations are parsed. For example, different extensions may be used to indicate that different service providers are supported. The platform-agnostic application deployment service parses the platform-agnostic notations and determines the function logic needed to work. For example, a platform-agnostic notation may indicate to create an endpoint using an API gateway and a serverless compute service, a queue or notification service to handle events, a database for data retrieval/storage, etc. language-agnostic entity definitions may be used to inject bindings to the platform-agnostic model source code to generate the platform-specific source code. The platform-agnostic application deployment service may determine a programming language consistent with the platform-agnostic model source code and replace platform-agnostic notations detected in the platform-agnostic model source code with programming language specific functions, decorators, models, and the like that are used to access computing resources of a specific computing resource service provider. As an example, platform-agnostic notations may be replaced by functions that invoke service provider endpoints that grant access to computing resources of the computing resource service provider.

The platform-specific source code may be compiled, interpreted, or otherwise used to generate a runtime such as a software application. The resulting application code may, upon execution, include logic to provision, deploy, communicate with, and otherwise utilize computing resources of a computing resource service provider. For example, the runtime may include code (e.g., generated from the platform-agnostic notations) that provisions a database of a computing resource service provider that stores data obtained from a user (e.g., based on source code that was written by a developer).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: using platform-agnostic source code to generate a runtime (e.g., software application) that utilizes computing resources of a computing resource service provider to execute the runtime. In other words, embodiments described herein are solutions (e.g., techniques described in connection with FIG. 7 that generate additional source code to utilize computing resources of computing resource service providers without requiring software developers to have specialized knowledge of how to interact with any specific computing resource service provider) necessarily rooted in computer technology (e.g., programmatically generating additional source code is rooted in computer technology) and overcome a problem specifically arising in the realm of computer technology (e.g., deployment of model source code to computing resource service providers presents challenges because additional technical knowledge may be required for a software developer to understand logic for and code for interacting with different types of computing resource service provider).

Techniques described herein present various advantages such as improving the functionality of a computer system by enabling one platform-agnostic model source code to be used to generate multiple runtimes that are supported by a plurality of computing resource service providers. Typically, source code that is generated using well-known, routine, and conventional methods does not support the ability to generate multiple runtimes that are supported by a plurality of computing resource service providers—accordingly, the techniques described herein improve the functionality of computer systems.

FIG. 1 illustrates a computing environment 100 in which an infrastructure managing framework is implemented, according to at least one embodiment. In an embodiment, a client computer system 102 provides platform-agnostic model source code 104 to a platform-agnostic application deployment service 106. The platform-agnostic model source code 104, in an embodiment, refers to source code that includes one or more platform-agnostic notations that are used to determine a set of computing resources of a computing resource service provider. The platform-agnostic model source code 104 may be processed by the platform-agnostic application deployment service 106 to determine platform-specific source code with bindings 108 and language-agnostic entity definitions 110.

The client computer system 102 may be any suitable computing entity such as a computing device described in connection with FIG. 8. The client computing system may include various software applications such as software development kits (SDK) and various software development tools such as compiler and interpreters. A user of the computer system may generate code (e.g., using input devices that allow the user to interact with a command line interface or graphical user interface). Generally speaking, a user can write source code which is used to generate software applications. In some embodiments, the client computer system 102 includes a software development kit (SDK) and/or cloud development kit (CDK) that can be utilized to communicate with a computing resource service provider. The client computer system 102 may establish a client-server relationship with a computing resource service provider by, for example, performing a set of authorization and/or authorization processes.

In an embodiment, a user of the client computer system generates platform-agnostic model source code 104. Platform-agnostic model source code 104, in an embodiment, includes platform-agnostic notations and source code according to a programming language. The source code according to the programming language may lack explicit references to specific computing resource service providers. Explicit references to specific computing resource service providers may refer to code, markup, or other annotations that may need to be replaced, altered, or otherwise modified as part of accommodating one computing resource service provider as opposed to another. In an embodiment, a platform-agnostic model source code 104 includes source code according to a programming language (e.g., Python code) and platform-agnostic notations which are not natively supported according to that programming language but can be parsed by the platform-agnostic application deployment service 106 to generate additional code (e.g., Python code) that can be used to communicate with and utilize computing resources of a computing resource service provider 112. The platform-agnostic model source code 104 may be a file of a specific extension. The platform-agnostic model source code 104, in an embodiment, is created by a user of the client computer system 102 and is provided to the platform-agnostic application deployment service 106 with parameters that indicate how source code should be generated from the platform-agnostic model source code 104 (e.g., an indication of a computing resource service provider that the code is to be configured to utilize).

Figure 2:
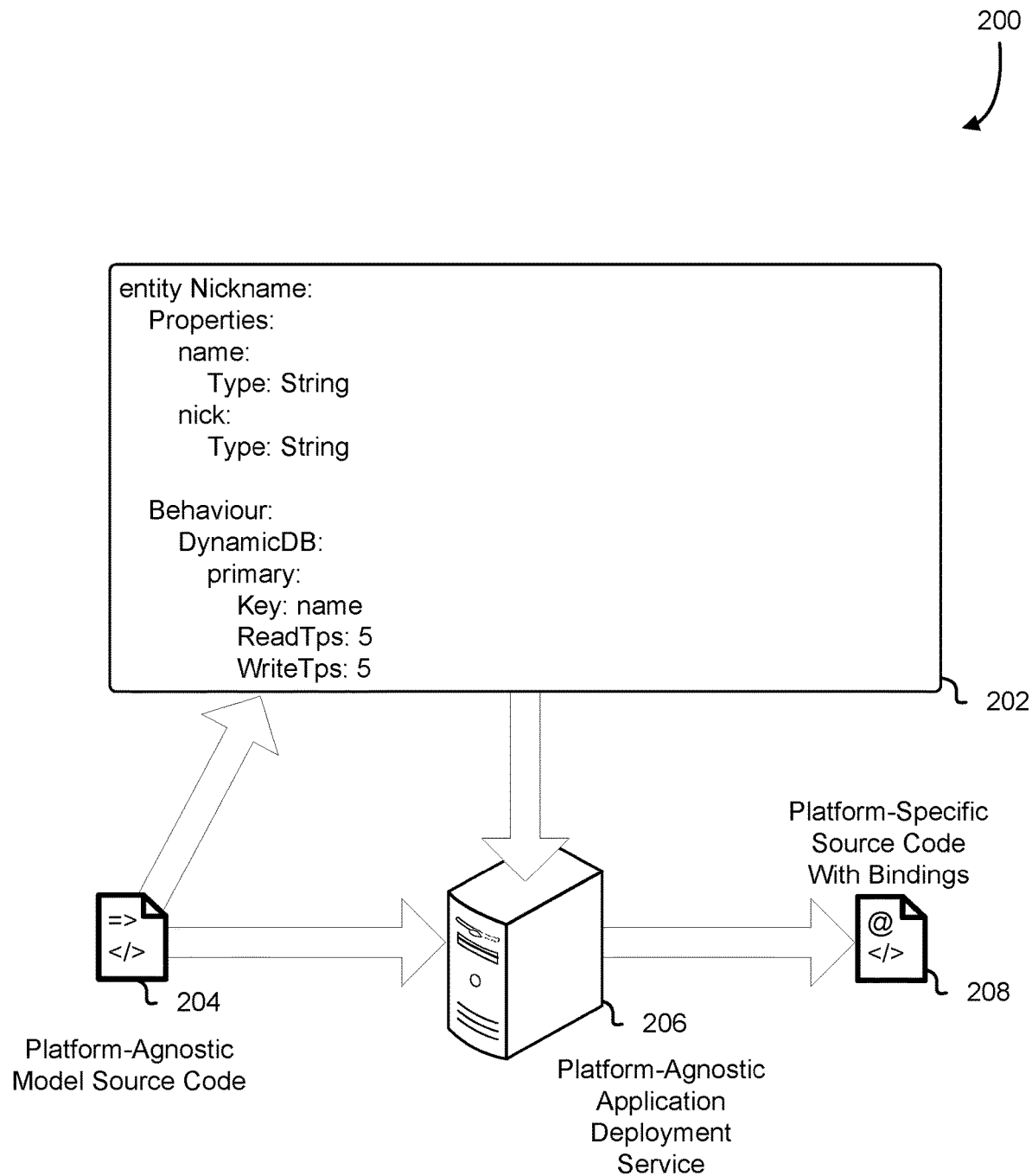
FIG. 2 shows an illustrative example of a computing environment in which a language-agnostic entity definition is utilized, according to at least one embodiment.
Figure 7:
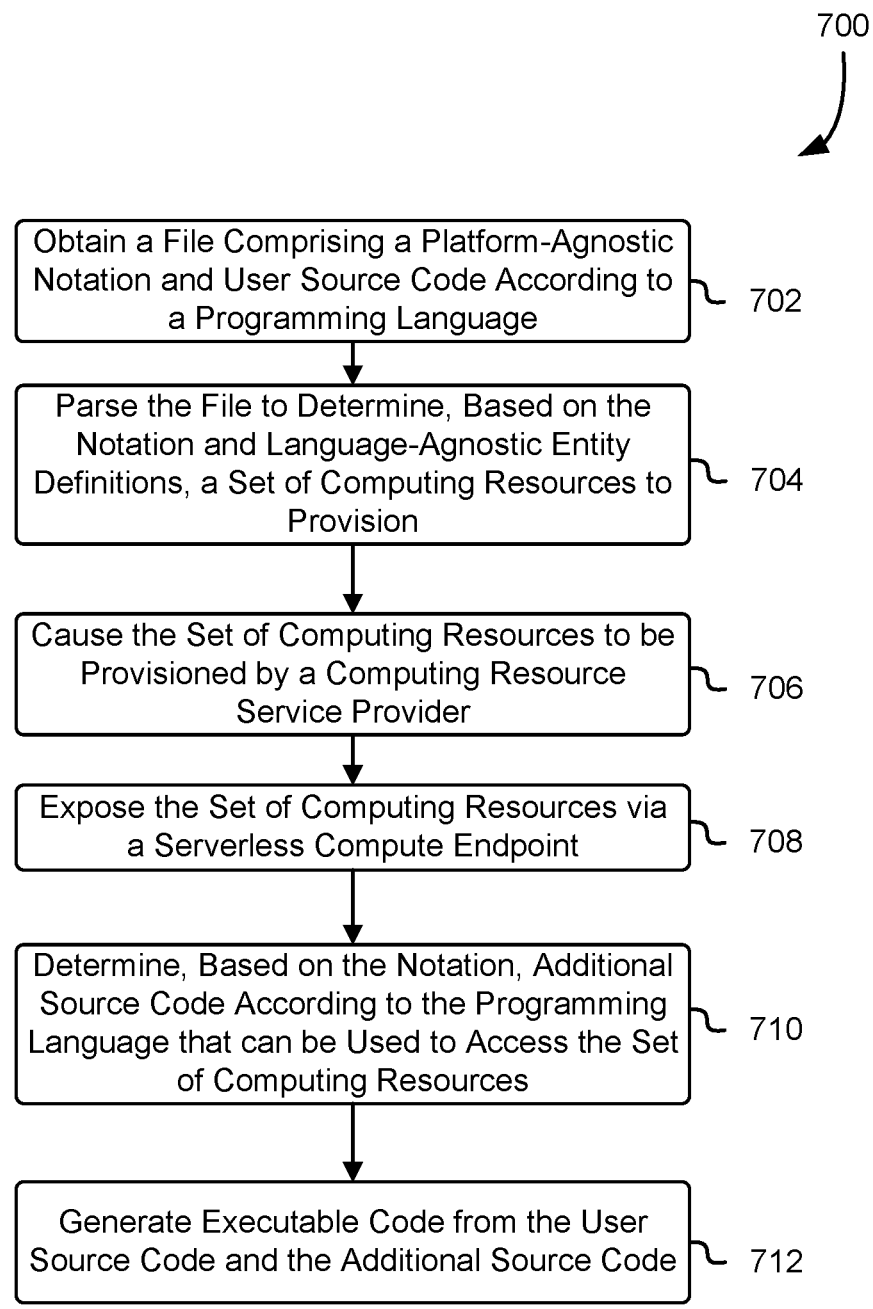
FIG. 7 shows an illustrative example of a process for an infrastructure managing framework in accordance with an embodiment.
Figure 8:
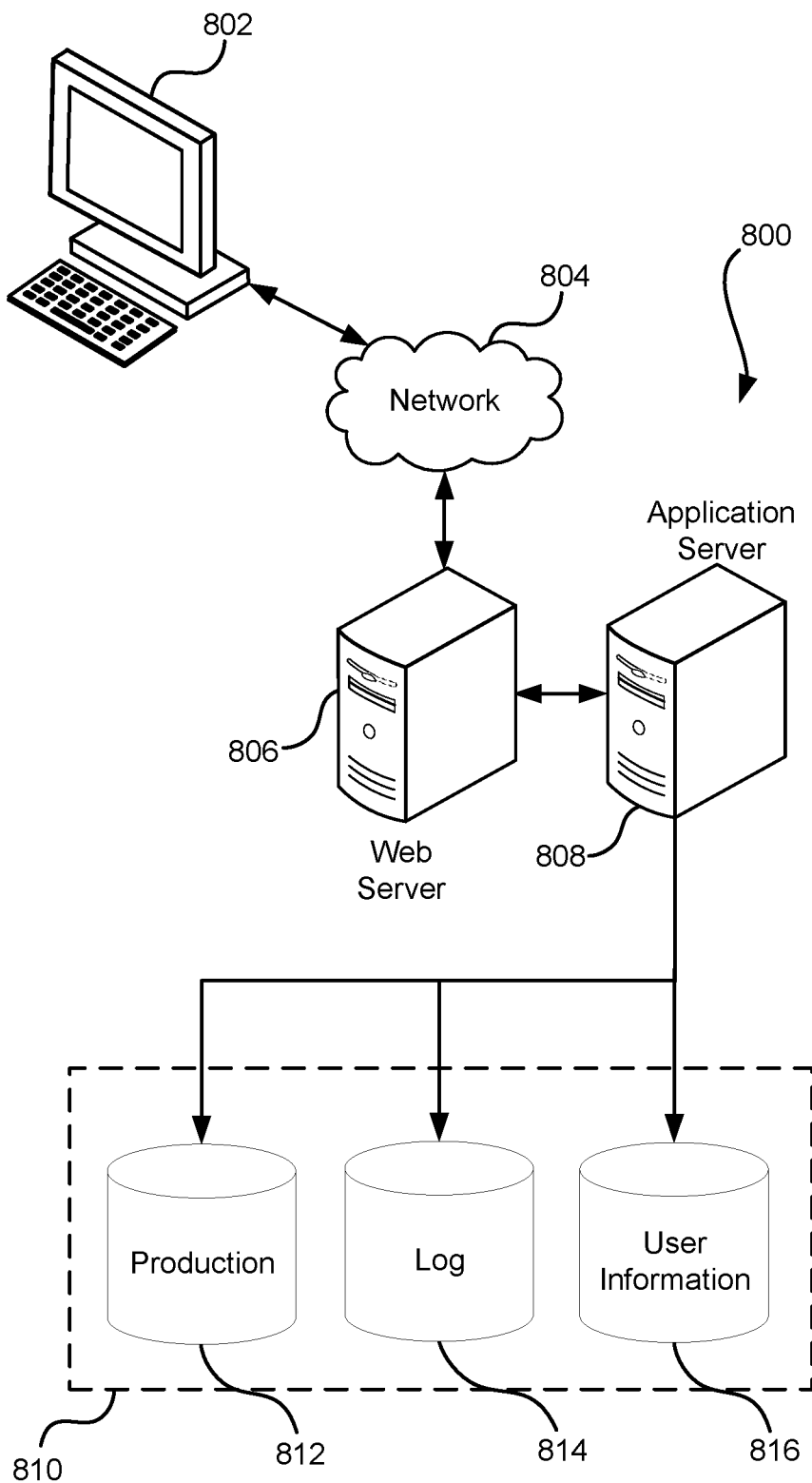
FIG. 8 illustrates a system in which various embodiments can be implemented.

The platform-agnostic application deployment service 106 illustrated in FIG. 2 may be a server such as a web server described in accordance with FIG. 8. The platform-agnostic application deployment service may be one or more hardware servers that includes executable code that, if executed, causes the one or more servers to parse the platform-agnostic model source code 104 to generate platform-specific source code with bindings 108. The platform-agnostic application deployment service 106 may be used to implement processes such as those described in connection with FIG. 7. In an embodiment, the platform-agnostic application deployment service 106 is a service provided by a computing resource service provider, which may or may not be the same as the computing resource service provider illustrated in FIG. 1. The platform-agnostic application deployment service may include software such as compilers, transpilers, interpreters, etc., that can be used to parse the platform-agnostic model source code 104 and/or generate a runtime (e.g., software application) from the platform-specific source code with bindings 108.

The language-agnostic entity definitions 110 (also referred to as entity definitions) may include programming language agnostic entity definitions that can be used to inject bindings to the platform-agnostic model source code 104 to generate the platform-specific source code 108. The platform-agnostic application deployment service may determine a programming language consistent with the platform-agnostic model source code 104 and replace platform-agnostic notations detected in the platform-agnostic model source code 104 with programming language specific functions, decorators, models, and the like that are used to access computing resources of a specific computing resource service provider. The language-agnostic entity definitions 108 may be in accordance with those discussed in connection with FIG. 2.

As an example, consider the following platform-agnostic notation:
=>EVENT("DeliveryProcessEvent", DeliveryProcessRequest)

This platform-agnostic notation may indicate that the platform-agnostic application deployment service is to send a "DeliveryProcessRequest" with a "DeliveryProcessRequest" object. The following entity definition may be generated:

```
entity DeliveryRequest:
    Properties:
        address:
            Type: Address
        item:
            Type: String
```

The entity is defined with its properties and property types can be defined. Various types of properties may be supported. This illustrative example of an entity definition may be used as part of defining a language-specific class object.

Entities may have dependencies on other entities. For example, continuing with the example above, "Address" object can be defined (e.g., in a separate address entity definition file) in the following manner:

```
entity Address:
    Properties:
        city:
            Nullable: False
            Type: String
        street:
            Nullable: False
            Type: String
        number:
            Nullable: False
            Type: Integer
        unit:
            Nullable: True
            Type: String
```

Of course, many other examples of entity definitions may exist. In an embodiment, entity definitions are language agnostic and can be used to allow for developers to interchange the model between applications.

The platform-specific source code with bindings 108 (which may also be referred to as platform-specific source code) may be compiled, interpreted, transpiled, or otherwise processed to generate executable code that, if executed by one or more processors of a computer system, causes the computer system to communicate with an endpoint of a computing resource service provider 112. The endpoint may be a serverless compute endpoint 114 as illustrated in FIG. 1. Calling the serverless compute endpoint 114 may cause a serverless compute service to reserve compute resources, provision the compute resources to execute a function generated or otherwise determined based at least in part on the platform-agnostic model source code 104. Execution of the function may cause the computing resource service provider 112 to utilize computing resources of the computing resource service provider as part of execution of a computer program based on the platform-specific source code.

Examples of serverless compute services include AWS Lambda, Google Cloud Functions, IBM Cloud Functions, Fn or Fn Project, platform-as-a-service service providers, and more. A serverless compute service may be serverless in the sense that computing resources are dynamically allocated to perform functions (also referred to as serverless compute functions, serverless functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. The computing resources may be in accordance with a computing environment that is suitable to execute the function. The computing resources can be physical, which may include physical server computers, or virtual, which may include virtual machines. For example, if the function being triggered is written in the Java programming language, the serverless compute service may allocate a Java Virtual Machine as the resource to run the coded function. Similarly, other programming languages may be supported. The allocation of computing resources is the scope of the function may be based on various factors including but not limited to attributes such as timeout duration, memory usage, and temporary storage requirements. Based on these requirements, a serverless compute service may provision greater or fewer computing resources for the execution of the serverless compute function.

In an embodiment, a serverless compute service is scalable. In an embodiment, computing resources allocated by a serverless compute service for execution of a serverless compute function scale according to the load requirements of the function being run. As a serverless compute service causes the execution of a serverless compute function, if the initial requirements change, such as memory usage, and temporary storage requirements, the serverless compute service may detect the increase in usage and allocation additional resources to the temporary runtime environment in which the function is running, or utilize a device such as a load balancer to determine how to allocate and free computing resources. In the case of a load balancer, for example, the serverless compute service may add more physical servers to balance the load requirements of a function to run across multiple computing resources. In an embodiment, when a function finishes executing in a serverless compute environment, the serverless compute service deprovisions or frees the resources that were allocated to run the function. Accordingly, in some embodiments, compute resources are not necessarily allocated for serverless compute functions (e.g., serverless compute endpoints) in an idle state, thereby improving the operation of a computer system by reducing the use of computing resources by the computer system. In some embodiments, computing resources utilized by a serverless compute function are not necessarily deprovisioned upon execution of the function—for example, if the function being run is utilized frequently, the serverless compute service may keep the resources "warm", meaning the original settings of memory and temporary storage, as well as any initialization code, are retained so that when the function is run again, the same runtime environment can be utilized, and initialization functions can be skipped, resulting in a more efficient repeated execution of the function. As the rate of requests to execute the function decrease, the computing resources may be deprovisioned, thereby relinquishing those resources and making them available to be used in the execution of other serverless compute functions.

In various embodiments, a client computer system 102 performs some or all of the operations described in connection with the platform-agnostic application deployment service 106. For example, the client computer system may include a client SDK that includes executable code that, if executed by one or more processors of the client computer system, cause the one or more processors to process the platform-agnostic model source code 104 to generate additional source code that is used to determine platform-specific source code with bindings 108 and generate a runtime, provision computing resources of the computing resource service provider, etc., which may be performed according to techniques described herein above and below.

FIG. 2 shows an illustrative example of a computing environment 200 in which a language-agnostic entity definition 202 is utilized, according to at least one embodiment. The language-agnostic entity definition 202 may be in accordance with those discussed elsewhere in this disclosure, such as those discussed in connection with FIG. 1. In an embodiment, platform-agnostic model source includes notations that can be processed by the platform-agnostic application deployment service. The platform-agnostic may be notations that are included between source code that is in accordance with a programming language known to one skilled in the art, such as Python, Java, C++, and more. In an embodiment, parsing a file involves scanning through the file to identify platform-agnostic tokens. As an example, at least three different types of platform-agnostic tokens may be supported:

| Token | Description | Syntax Example |
|---|---|---|
| <= | These are events that will trigger the function being created | <= REST_POST("/delivery", DeliveryRequest) |
| => | These are events that the function will trigger or the messages it will send | => EVENT("DeliveryProcessEvent", DeliveryProcessRequest) |
| < > | These are related to input-output components such as databases | < > DHASH("deliveries", Delivery) |

Consider the language-agnostic entity definition 202 shown in FIG. 2 as an illustrative example. The language-agnostic entity definition 202 provides a data access object behavior that defines parameters for a dynamic database. The dynamic database may be implemented, as an example, by a NoSQL database system. In an embodiment, the language-agnostic entity definition 202 defines characteristics of computing resources to be provisioned by the computing resource service provider. The language-agnostic entity definition 202 illustrated in FIG. 2 defines two properties—"name" and "nickname"—which may be attributes or fields that can store different values (e.g., as a key value pair). As another example, the language-agnostic entity definition can define the schema of a relational database system. The language-agnostic entity definition 202 shown in FIG. 2 also defines other properties of the dynamic database, such as the key being a name (e.g., for indexing on) and additional fields relating to read TPS and write TPS. The language-agnostic entity definition 202 is merely an illustrative example and there are many other such definitions that can be defined.

In an embodiment, the language-agnostic entity definition 202 is partially generated from the platform-agnostic model source code 204. In an embodiment, language-agnostic entity templates exist in which the skeleton or outline for certain types of resources are defined. These templates may have placeholders that are later filled in when the platform-agnostic model source code 204 is processed. The placeholders that are to be later filled in may include variable names such as the name for identifying database tables, attributes, events, notifications, endpoints, and more. For example, the platform-agnostic model source code may be parsed to determine the name of the database table (i.e., "Nickname" table), the attributes of the table (i.e., "name" and "nickname") and other properties of the table which may be configured specifically for the particular platform-agnostic model source code 204 being deployed.

The platform-agnostic model source code 204 may be parsed and processed by the platform-agnostic application deployment service 206 to produce platform-specific source code with bindings 208 (also referred to more simply as platform-specific source code). The platform-specific source code may differ from the platform-agnostic model source code 204 in various respects. For example, the platform-agnostic model source code 204 and the platform-specific source code 208 may have different file extensions; the platform-specific source code 208 can be successfully compiled or interpreted, whereas compiling or interpreting the platform-agnostic model source code 204 results in an error due to the platform-agnostic notations being incompatible or otherwise not in accordance with the programming language of the user source code.

The platform-specific source code 208 may be generated by replacing platform-agnostic notations with code according to the programming language of the source code. For example, the generated code may be a function to handle the platform-agnostic token and parameters specified in the platform-agnostic model source code 204. The platform-agnostic application deployment service may create all the components and scripts for deploying computing resources to a specific computing resource service provider environment. In some embodiments, different computing resource service providers are supported, and depending on the service provider selected, the additional code generated to replace the platform-agnostic notations may be different. Serverless compute functions (e.g., serverless compute endpoints) may be injected with logic that can be used to connect with the computing resource service provider infrastructure.

Figure 3:
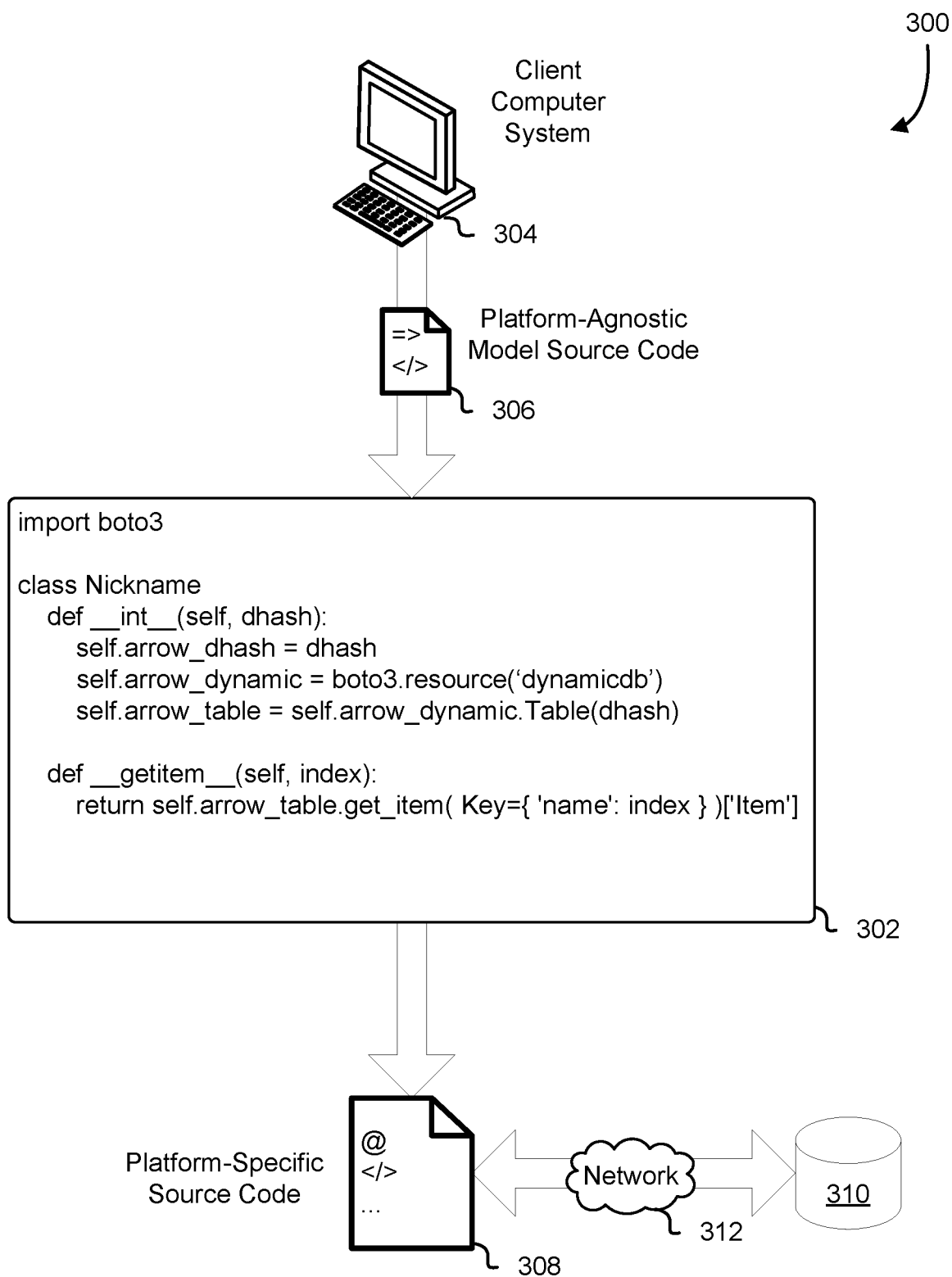
FIG. 3 shows an illustrative example of a computing environment in which platform-specific source code is generated, according to at least one embodiment.

FIG. 3 shows an illustrative example of a computing environment 300 in which platform-specific source code is generated, according to at least one embodiment. The additional source code may include data model source code 302 that is generated, which may include instructions that allow a runtime (e.g., software application) to utilize computing resources of a computing resource service provider. FIG. 3 illustrates an example in which additional code to access a table of a dynamic database is generated.

In an embodiment, may include data model source code 302 is generated which can be executed by one or more processors of a computer system to enable that computer system to utilize computing resources of a computing resource service provider. The additional code may be generated as part of a process for an infrastructure managing framework, such as processes described in connection with FIG. 7. The additional code may be generated by a platform-agnostic application deployment service as part of generating platform-specific source code from platform-agnostic model source code which, in various embodiments, is described in greater detail in connection with FIG. 1. It should be noted that the data model source code 302 illustrated in FIG. 3 may be only a portion of the source code generated, and that other additional source code (e.g., decorators, imports, and more) may be generated. The data model source code 302 illustrated in FIG. 3 may be utilized in connection with embodiments described in connection with FIGS. 2 and 4-6. The additional source code may be in accordance with a language from the platform-agnostic model source code—for example, if the platform-agnostic model source code 306 includes Python code and platform-agnostic notations, the data model source code 302 generated may be in Python and may be a separate Python file that is referenced by the platform-specific source code 308.

FIG. 3 shows an illustrative example of data model source code 302 that is generated. The data model source code 302 may entirely be generated by the platform-agnostic application deployment service (e.g., not generated by the user). The data model source code 302 may import one or more modules, such as modules that can be used to access a computing resource service provider. In an embodiment, the client computer system 304 provides authentication and/or authorization information that is used to authenticate the client computer system with the computing resource service provider and/or authorize access to various computing resources that may be utilized. In an embodiment, the data model source code 302 links to a dynamically linked library (DLL), utilizes a client SDK library that can be used to establish a client-server relationship with the computing resource service provider (or a service provided therein), and more.

Returning to FIG. 3, the data model source code 302 may furthermore define one or more data access objects that can be utilized to transparently access computing resources of the computing resource service provider. For example, the Nickname class may refer to a data access object that can be instantiated (e.g., in Python) and the instantiated object can be used to perform various operations. In an embodiment, the Nickname class includes an initiation routine that initializes (e.g., creates) a dynamic database resource and creates a table resource having a particular name (e.g., specified by the dhash parameter). In an embodiment, the Nickname class exposes an accessor that returns a set of attributes for a database table item with a given primary key (e.g., looking up a nickname attribute from a name attribute).

The client computer system 304 illustrated in FIG. 3 may be in accordance with systems described elsewhere in this disclosure, such as those discussed in connection with FIGS. 1 and 8. The client computer system 304 may provide platform-agnostic model source code 306 to a platform-agnostic application deployment service (e.g., as described in FIG. 1) and the platform-agnostic application deployment service may generate the data model source code 302.

The data model source code 302 may be rolled up and incorporated into the platform-specific source code 308. In some embodiments, the data model source code 302 is injected inline into the platform-specific source code 308. In some embodiments, the data model source code 302 is in a different file that is referenced by the platform-specific source code (e.g., imported). The platform-specific source code 308 and the data model source code 302 may be compiled to generate a runtime or software application that can be used to access computing resources of a computing resource service provider. For example, FIG. 3 illustrates an example in which the data model source code 302 can be used by the runtime to access a dynamic database 310 that is hosted by a computing resource service provider. The computing resource (e.g., dynamic database) may be accessible via a network 312 such as those described in connection with FIG. 8. For example, the network 312 may be the Internet, and the computing entity that executes the runtime may communicate via the Internet with the computing resource service provider to access the dynamic database 310.

Figure 4:
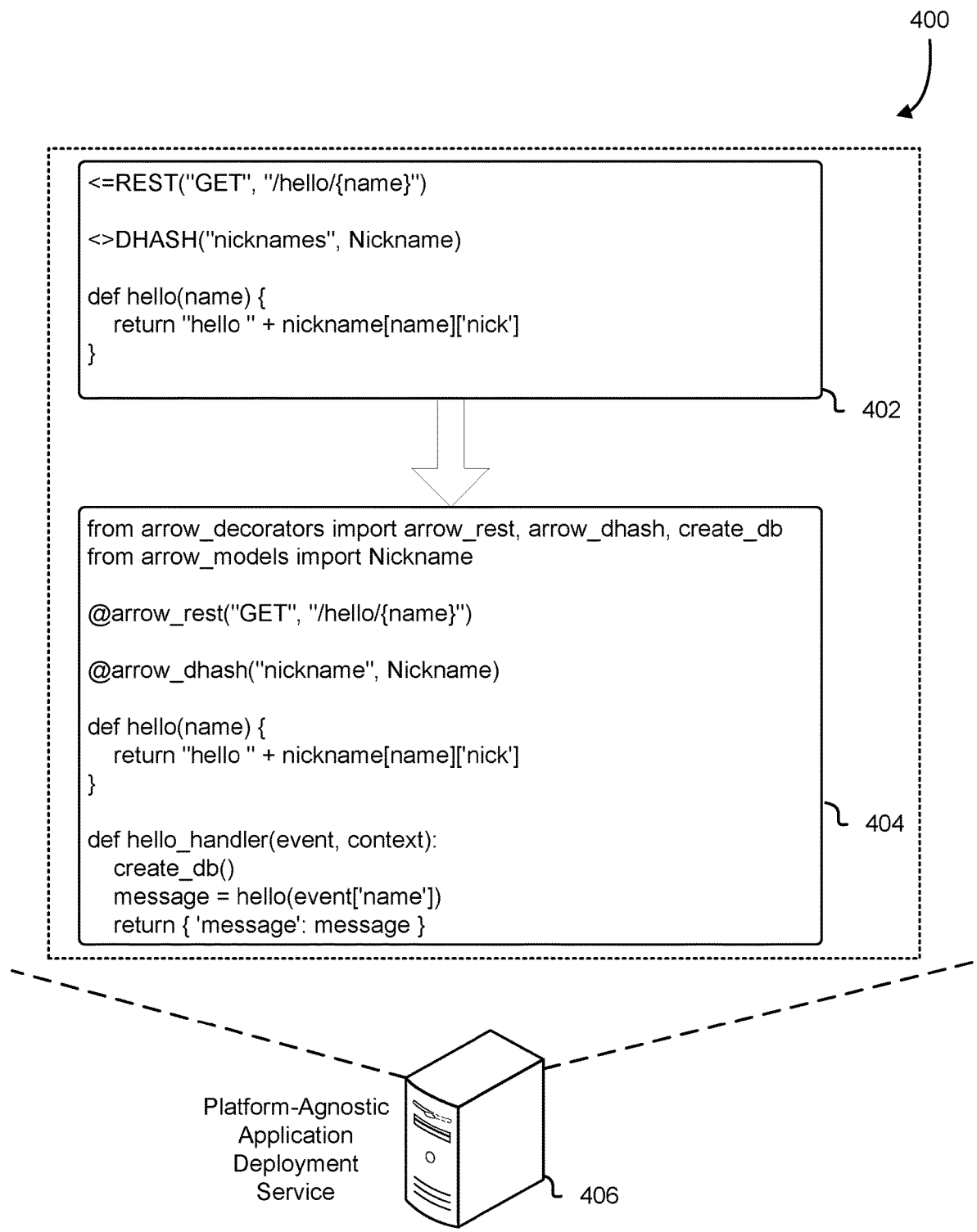
FIG. 4 shows an illustrative example of a computing environment in which language-agnostic model source code is parsed and converted to language-specific source code, in accordance with at least one embodiment.

FIG. 4 shows an illustrative example of a computing environment 400 in which language-agnostic model source code 402 is parsed and converted to language-specific source code 404, in accordance with at least one embodiment. A platform-agnostic application deployment service 406 may be used to perform at least some of the steps involved in parsing and converting the language-agnostic model source code 402 to language-specific source code 404. In an embodiment, the language-agnostic model source code 402 comprises a notation indicating a set of computing resources and source code according to a programming language such as Python. The source code may be user-generated and, accordingly, referred to as user source code. In an embodiment, the source code includes an identifier such as a UUID. The notation may be a platform-agnostic notation, in the sense that the platform-agnostic notation does not necessarily identify or bind the notation to any specific computing resource service provider. In an embodiment, the platform-agnostic notation identifies a type of computing resource, such as a database or REST endpoint. The platform-agnostic application deployment service 406 may be a web server such as those described in connection with FIG. 8. The computing environment 400 may be in accordance with embodiments described elsewhere in this disclosure, such as those discussed in connection with FIGS. 1-3 and 5-7.

In an embodiment, the platform-agnostic application deployment service 406 parses one or more files having a specific extension that indicates the file is language-agnostic model source code (e.g., all *.arrow files) and examines the files for platform-agnostic notations. A finite number of platform-agnostic types may be supported, each having a specified syntax which is validated by the platform-agnostic application deployment service 406 akin to how syntax of source code is verified during a pre-compiler or compiler. The platform-agnostic notation parameters may be validated. Upon successful validation, the platform-agnostic application deployment service 406 may emit additional source code according to the programming language of the user source code that leaves the user source code as is, but replaces the platform-agnostic notations with language-specific decorators. For example, if the platform-agnostic notations are included with Python code, the platform-agnostic notations may be replaced by Python decorators. At runtime, these decorators may provide variables that are exposed for the client, so that they interact with the computing resource service provider to access computing resources as part of execution of the application or runtime in a transparent manner.

FIG. 5 shows an illustrative example of a computing environment 500 in which function decorators 502 that can be defined and used in connection with platform-specific source code 504, in accordance with at least one embodiment. The function decorators and platform-specific source code may be generated by the platform-agnostic application deployment service 506, which may be implemented in accordance with those described elsewhere in this disclosure, such as those discussed in connection with FIG. 1.

The decorators 502 may be generated as part of the process for converting platform-agnostic model source code to platform-specific source code with bindings. Platform-agnostic notations may be replaced with decorators (e.g., Python decorators as illustrated in FIG. 5) that utilize data access objects such as those discussed in connection with FIG. 3. Decorators may be callable objects that can be used to modify functions and classes. Callable objects may refer to objects that accept arguments and return objects. Function decorators may refer to functions which accept function references as arguments and add wrapper around them and return the functions with the wrappers as new functions. The platform-specific source code 504 may import the decorators from another file (e.g., the decorators 502 shown in FIG. 5 may be in a different file). The function decorators may be additional source code that is generated by the platform-agnostic application deployment service.

Figure 6:
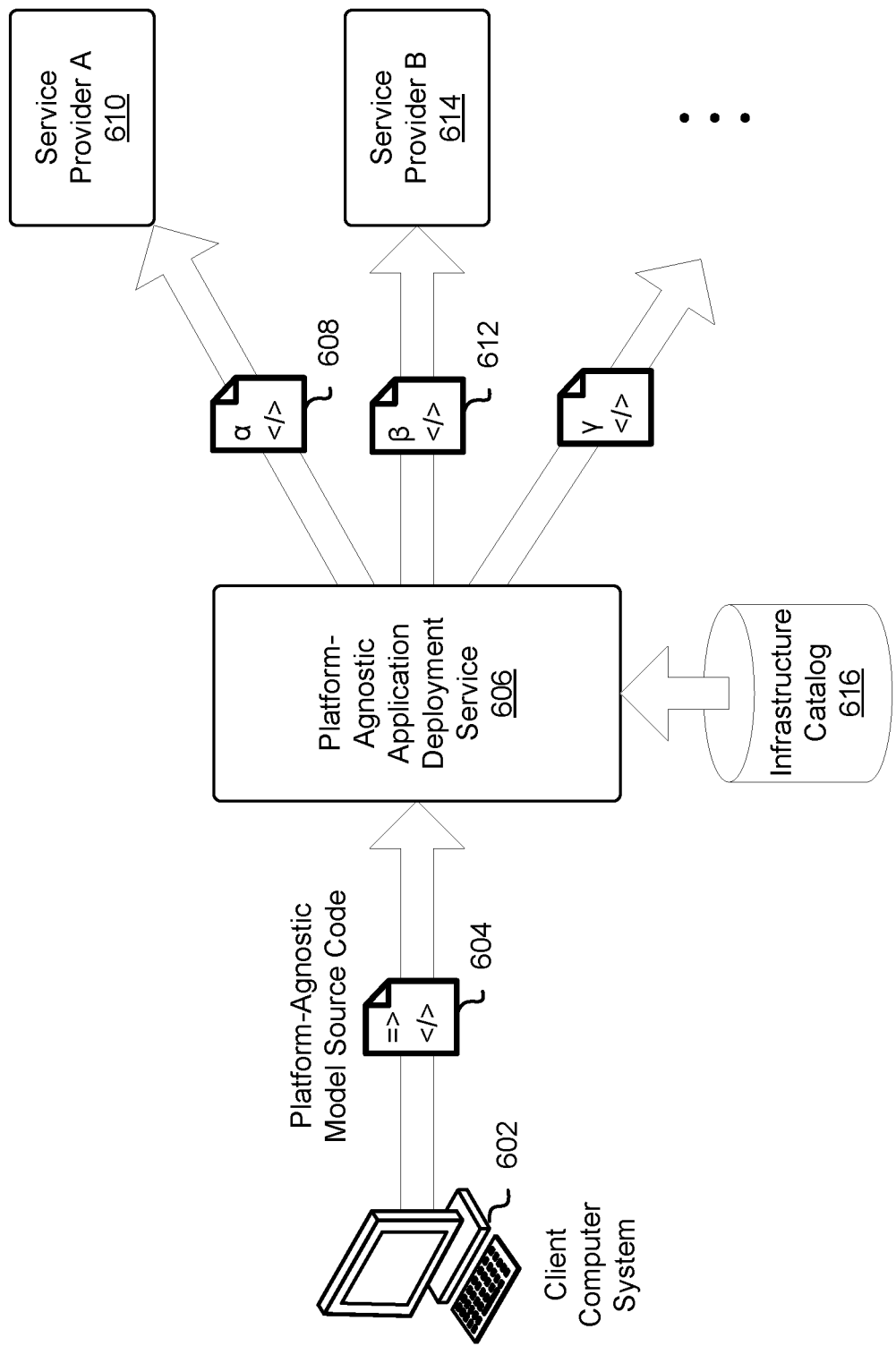
FIG. 6 shows an illustrative example of a computing environment in platform-agnostic model source code is parsed to generate different platform-specific source codes that can be used to access different computing resource service providers, in accordance with at least one embodiment.

FIG. 6 shows an illustrative example of a computing environment 600 in platform-agnostic model source code is parsed to generate different platform-specific source codes that can be used to access different computing resource service providers, in accordance with at least one embodiment. The computing environment illustrates a client computer system 602 that provides platform-agnostic model source code 604 to a platform-agnostic application deployment service 606 that generates a first platform-specific source code 608 that is specific to a first computing resource service provider 610, a second platform-specific source code 612 that is specific to a second computing resource service provider 614 and so on. In an embodiment, the source code for accessing the various computing resource service providers illustrated in FIG. 6 is different. In some embodiments, the platform-agnostic application deployment service is a service of one of the computing resource service providers illustrated in FIG. 6.

In an embodiment, the client computer system 602 specifies a particular computing resource service provider that the source code is to be deployed on. The specifying may be performed inline (e.g., as a platform-agnostic notation), supplied by the client as a web API request to the platform-agnostic application deployment service, and more.

The client computer system 602, in an embodiment, provides the platform-agnostic model source code 604 to the platform-agnostic application deployment service 606 and also indicates (e.g., separately) one or more computing resource service providers to deploy the source code on. The infrastructure catalog 616 may include templates for how to generate code that can be used to replace platform-agnostic notations to communicate with the respective computing resource service providers (e.g., how to call endpoints at the first computing resource service provider 610 and the second computing resource service provider 614). Accordingly, if the client computer system 602 requests for a runtime (e.g., software application) to be generated for the first computing resource service provider 610, then the corresponding templates may be obtained and used to generate the platform-specific entity definitions which are used to inject the bindings and platform-specific code to the user source code that enables it to communicate with the first computing resource service provider 610. As a result, the first platform-specific source code 608 is generated. Similarly, a different template may be retrieved from the infrastructure catalog 616 for generating the second platform-specific source code 612 that allows the resulting runtime to utilize computing resources of the second computing resource service provider 614. The infrastructure catalog may be implemented as a data storage system such as those discussed in connection with FIG. 8.

FIG. 7 shows an illustrative example of a process 700 for an infrastructure managing framework in accordance with an embodiment. Some or all of the process 700 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 700 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The system implementing the process 700 may be a service of a computing resource service provider, such as by a platform-agnostic application deployment service in accordance with those described in connection with FIG. 1. In an embodiment, the system is performed (e.g., locally) on a client computer system as part of a client SDK.

The system may obtain 702 a file. In an embodiment, the system scans through all files in a directory (e.g., including files in subfolders) and identifies all files with a specific extension (e.g., *.arrow files), thereby obtaining files to parse. In an embodiment, the system obtains the file by receiving a request from a client computer system to generate a runtime, the request specifying a location (e.g., local directory, network location) where the file can be found. Thus, the request may encode the file (e.g., network location or directory where the file may be found). An obtained file may be a file having the extension specified as above. The extension may indicate that notations are supported. In an embodiment, the file includes one or more notations and source code according to a programming language. The programming language may be a compiled language (e.g., C++), an interpreted language (e.g., Python), and various other types of programming languages known to one of ordinary skill in the art. Notations may be defined such that they are not natively supported by the programming language—for example, attempting to compile or interpret the obtained files may result in an error such as a compiler error, syntax error, etc., if the obtained files include one or more notations, which may be due to the platform-agnostic notations being incompatible or otherwise not in accordance with the programming language of the user source code. In some cases, an error may result even for files that do not include notations (e.g., the file is linked to another file that includes notations that cannot be interpreted/compiled). In an embodiment, the system obtains the file by receiving the file from a client computer system as part of a web service API request by the client computer system to generate executable code for an application and provision computing resources that can be utilized by the application when it is executed. The file may include user source code, which may refer to source code that is written by a user. Source code written by a user may include code that the user generated directly (e.g., through the use of an input device such as a keyboard).

In an embodiment, the system parses 704 the file to determine, based on the notation and one or more language-agnostic entity definitions, a set of computing resources to provision. This step may be repeated for multiple files, such as in embodiments where the system scans through all files in a directory, the system may also parse each file having a particular extension. Upon detecting a platform-agnostic token, the token parameters may be validated. The validation may be performed to ensure that the parameters are in accordance with predefined syntax and that commands are not misspelled, are not missing parameters, are not malformed (e.g., strings are encased in quotations), and the like.

The validation may be performed similarly to how the syntax of source code is validated.

In an embodiment, the system transpiles the file into a source code and generates the service provider infrastructure consists in fetching all the entity files. The entities may be used to generate the platform-agnostic model files that will include generated source code (e.g., according to a programming language such as Python) that provide the bindings with the computing resource service provider and follow the structure defined in the parsed language-agnostic entity definitions. The language-agnostic entity definitions described in connection with the process 700 may be in accordance with those discussed in connection with FIG. 2. In an embodiment, when interacting with services such as a database service, the platform-agnostic models provide a data access object behavior, providing a dictionary-like interface for clients.

After all the arrow model files have been successfully generated, the platform-agnostic parser identifies the associated platform-agnostic type (e.g., "REST" or "DHASH") which may have different parameters. In an embodiment, the parser performs the custom validations for each of these platform-agnostic types, verifying that the supplied parameters are valid. If the supplied parameters are invalid (e.g., missing parameter, malformed parameters) the platform-agnostic parser may return an error (e.g., as a platform-agnostic parser error that is surfaced through logs, command line interface, graphical user interface). Upon successful validation, the platform-agnostic parser emits new source code according to a programming language (e.g., new Python code) that leaves the user's source code as-is but switches (e.g., replaces) the notations with additional source code. In an embodiment, the additional code is Python decorators that replaces the platform-agnostic notations. The replacement may be performed in accordance with techniques described in connection with FIG. 4.

Upon completion of the file or files being parsed, the system will have both replaced the platform-agnostic notations with programming language-specific decorators and will have gathered infrastructure information usable to generate the computing resource service provider infrastructure in a subsequent step. In an embodiment, the decorators are written in a more generic way but some of the values are hardcoded (e.g., variable names).

In an embodiment, the system causes 706 the set of computing resources to be provisioned by a computing resource service provider. Causing a computing resource service provider to provision the set of computing resources may involve the system leveraging a software development kit (SDK) or cloud development kit (CDK) to generate the desired infrastructure which may be or may be based on the set of computing resources. In an embodiment, the system leverages the L2 component that the CDK provides for a repository of infrastructure building blocks that will be hydrated with parameters obtained from both language-agnostic entity definitions and parsed files. The set of computing resources may include various types of computing resources that are provided by services of the computing resource service provider such as compute instances (e.g., virtual machines), data storage, queues, notifications, dynamic databases (e.g., non-relational databases such as NoSQL databases), relational databases, serverless compute, and combinations thereof. Generally speaking, the syntax for utilizing each type of computing resources may be different and customizable.

The system, in an embodiment, exposes 708 the set of resources via a serverless compute endpoint. The serverless compute endpoint may refer to a serverless compute endpoint that can be used to make the set of computing resources available. For example, the serverless compute endpoint may make the set of computing resource available by executing a serverless compute function (e.g., a Lambda function) that is able to connect to, utilize, or otherwise utilize computing resources of the computing resource service provider. As a specific example, a software application generated using the process 700 may include a binding generated from a notation that is transpiled or otherwise processed to generate executable code that can be used to call the serverless compute endpoint with parameters that indicates a particular database table that the application will read and write data to and a serverless compute service receives the call, provisions a set of compute resources (e.g., a virtual machine instance, container, or other virtualized environment) to execute a serverless compute function that processes the endpoint call by utilizing the set of compute resources based on the specific notation type and parameters associated with the call. As an example, the serverless compute function associated may make API requests to a database service or database system (e.g., non-relational database as discussed in connection with FIGS. 2-5) to read or write data and the result of the database operation (e.g., a success/failure indication, retrieved data) may be returned as part of a response to the endpoint call. In an embodiment, the serverless compute endpoint is accessible via a runtime such as a software application generated from the file or files described above. Generally speaking, any suitable endpoint, such as a web server API endpoint to a service frontend may be suitable for exposing the set of resources. The serverless compute endpoint may be exposed (e.g., provisioned and made available for use by a computing entity that executes the runtime) in the manner described above in connection with FIG. 1. The endpoint may be a REST endpoint.

The system may determine 710, based on the notation, additional source code according to the programming language that can be used to access the set of computing resources. For example, Python decorators may replace platform-agnostic notations to generate a Python file that can be interpreted. The file may be used to generate a software application or other suitable runtime. When the runtime is executed, the original source code written by the user may, upon reaching the decorators, invoke code that communicates with the computing resource service provider and uses the provisioned resources in connection with execution of the runtime. For example, runtime may reach a notation that was replaced with code that allows the system running the runtime to communicate with the computing resource service provider (e.g., via a serverless compute endpoint) to access data stored in a database of the computing resource service provider. The user writing the platform-agnostic source code is not required to have domain knowledge of how to write code (e.g., Python code) to interact with the computing resource service provider—that additional source code may be generated by the system based on the platform-agnostic notations the user provides and the language-agnostic entity definitions. A compiler or interpreter may be used to generate 712 the executable code from the user source code and the additional source code that was generated from the platform-agnostic notations. The result may be a runtime such as a software application. The executable code (e.g., runtime) may be provided, returned, or otherwise made available to the client computer system that requested generation of the executable code and/or provided the file. In an embodiment, the executable code (or a network location indicating where the executable code can be accessed) is provided as part of a response to a request to generate the executable code.

The process 700 may be modified, extended, or otherwise adjusted in some embodiments, to be used to generate multiple different runtimes from the same platform-agnostic file. In an embodiment, the client computing entity that provides the file to the system also provides additional information that indicates one or more computing resource service providers that indicate corresponding runtimes that are to be generated. The system may have access to a catalog of language-agnostic entity definitions, wherein a first set of language-agnostic entity definitions are supported by a first computing resource service provider and a second set of language-agnostic entity definitions are supported by a second computing resource service provider. There may be some or no intersection between the first and second sets of language-agnostic entity definitions. A subset of the language-agnostic entity definitions may be selected based on which computing resource service provider the client has indicated the runtime is to be generated for. Accordingly, the different sets of language-agnostic entity definitions can be used to provision computing resources on different computing resource service providers and/or generate different additional source code that can be used to access the different computing resource service providers.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a file comprising:
a notation indicating a set of computing resources, a notation type, and a set of parameters; and
source code according to a programming language;
causing a computing resource service provider to provision the set of computing resources, wherein the set of computing resources are accessible via a serverless compute endpoint;
parsing the file to determine additional source code by at least:
parsing the notation to identify the set of computing resources;
validating the notation type and the set of parameters by at least determining that the set of parameters are in accordance with the notation type;
generating a data access object based at least in part on the notation, wherein the data access object comprises one or more functions that can be used to access the set of computing resources via the serverless compute endpoint; and
generating, as a result of validating the notation type and the set of parameters and based on the notation, the additional source code according to the programming language, the set of computing resources, and an entity definition selected based on the notation, wherein the additional source code includes code to utilize at least a portion of the set of computing resources via the serverless compute endpoint and further wherein the additional source code comprises the data access object; and
generating a runtime from the source code and the additional source code, wherein the runtime, if executed, causes at least the portion of the set of computing resources to be accessed via the serverless compute endpoint.

2. The computer-implemented method of claim 1, wherein the entity definition is a language-agnostic entity definition that encodes information that is used to generate a first additional source code according to a first programming language for exposing computing resources of the computing resource service provider and is also used to generate a different second additional source code according to a different second programming language for exposing the computing resources of the computing resource service provider.

3. The computer-implemented method of claim 1, wherein the runtime is a software application.

4. A system, comprising:
one or more processors;
memory that stores computer-executable instructions that, if executed, cause the one or more processors to:
obtain:
a notation indicating a set of computing resources;
an indication of a computing resource service provider; and
source code according to a programming language;
select an object definition based at least in part on the indication, wherein the object definition defines one or more characteristics of computing resources of the set of computing resources provisioned by the computing resource service provider;
cause, based on the notation and the object definition, the computing resource service provider to make the set of computing resources available via an endpoint;
determine, based on the notation, the set of computing resources, and one or more entity definitions generated based at least in part on the notation, additional source code that includes instructions to access the endpoint by at least:
  parsing the notation to determine a notation token, notation type, and a set of parameters;
  determining, based on a syntax, that the notation is supported; and
  in response to determining that the notation is supported, generating a class object based on the notation type and the set of parameters, thereby generating at least a portion of the additional source code; and
generate executable code from the source code and the additional source code, wherein the set of computing resources is accessed via the endpoint as part of execution of the executable code.

5. The system of claim 4, wherein the computer-executable instructions to generate the executable code comprise instructions to use a compiler or interpreter to generate the executable code.

6. The system of claim 4, wherein the computer-executable instructions to obtain the notation and the source code include instructions that, if executed, cause the one or more processors to obtain the notation and the source code from a file of a specific extension indicating notations are supported.

7. The system of claim 6, wherein:
the computer-executable instructions include instructions that, if executed, further cause the one or more processors to transpile the file to generate a second file, the second file with a file extension according to the programming language and comprising the source code and the additional source code; and
the computer-executable instructions to generate the executable code from the source code and the additional source code include instructions that, if executed, cause the one or more processors to use the second file to generate the executable code.

8. The system of claim 4, wherein the endpoint is a web server application programming interface (API) endpoint.

9. The system of claim 4, wherein the notation is incompatible with the programming language.

10. The system of claim 4, wherein:
a file comprises the notation and the source code;
the computer-executable instructions to obtain the notation and source code include instructions that, if executed, cause the one or more processors to obtain the notation and the source code from a request provided to the system by a client computer system, the request encoding the file; and
the computer-executable instructions include instructions that, if executed, further cause the one or more processors to provide the executable code to the client computer system.

11. A non-transitory computer-readable storage medium comprising executable instructions that, as a result of being executed by one or more processors of a computer system, cause the computer system to:
obtain:
  a notation indicating a set of computing resources, a type of computing resource, and a set of characteristics; and
  source code according to a programming language;
process the notation to determine additional source code by at least:
  verifying the type of computing resource and the set of characteristics by at least determining that the set of characteristics are in accordance with the type of computing resource;
  generating a data object based at least in part on the notation, wherein the data object comprises one or more routines that can be used to access the set of computing resources via an endpoint; and
  determining, as a result of verifying the type of computing resource and the set of characteristics and determining an entity definition based on the notation, the additional source code according to the programming language, the set of computing resources, and the entity definition, wherein the additional source code includes instructions to access the set of computing resources via the endpoint of a computing resource service provider and further wherein the additional source code comprises the data object;
cause the computing resource service provider to provision the set of computing resources, wherein the set of computing resources are accessible via the endpoint; and
generate executable code from the source code and the additional source code, wherein execution of the executable code results in the set of computing resources being accessed via the endpoint.

12. The non-transitory computer-readable storage medium of claim 11, wherein the additional source code comprises one or more function decorators.

13. The non-transitory computer-readable storage medium of claim 11, wherein the additional source code comprises code that includes instructions to generate the endpoint.

14. The non-transitory computer-readable storage medium of claim 11, wherein the programming language is Python and the additional source code comprises decorators.

15. The non-transitory computer-readable storage medium of claim 11, wherein the computer system is a resource of the computing resource service provider.

16. The non-transitory computer-readable storage medium of claim 11, wherein the notation is a platform-agnostic notation.

17. The non-transitory computer-readable storage medium of claim 16, wherein the instructions further comprise instructions that, as a result of execution, cause the computer system to:
process the platform-agnostic notation to determine a second additional source code according to the programming language, wherein the second additional source code includes instructions to access a second set of computing resources of a second computing resource service provider via a second endpoint; and
generate a second executable code from the source code and the second additional source code, wherein execution of the second executable code results in the second set of computing resources being accessed via the second endpoint.

* * * * *